United States Patent Office 3,817,848
Patented June 18, 1974

3,817,848
EFFLUENT TREATMENT
William Ewert Scragg, Rye, England, assignor to Cadborough Engineering Company, Limited, Hertford, England
Filed Feb. 14, 1972, Ser. No. 225,989
Claims priority, application Great Britain, Feb. 23, 1971, 5,244/71
Int. Cl. C02c 5/12; C02b 1/82
U.S. Cl. 204—152                                9 Claims

ABSTRACT OF THE DISCLOSURE

Method and apparatus for treatment of effluent, particularly farm effluent, in which the effluent including solids and fibrous matter to be treated is stored in a storage container and passed into an aeration compartment only after a portion of the treated effluent has been removed. Fibrous material with entrained activated sludge is removed over the edge of the aeration compartment via a rotary screen filter.

---

The invention relates to treatment of highly concentrated effluents and more particularly, although not exclusively, to the treatment of farm effluent by biological extended aeration.

According to one aspect of the invention there is provided a method of treating effluent which comprises storing the effluent in a storage container and passing a predetermined amount of such stored effluent into an aeration compartment subsequent to a predetermined amount of water being allowed to pass from the output of the system.

Preferably the content of the aeration compartment is passed through two settling compartments prior to being passed to an output to drain. The output from the second settling compartment may be fed at least in part to an output reservoir.

Output from the reservoir and/or the second settling compartment may also be passed to the storage container to maintain it at least at a predetermined level.

The content of one of the settling compartments or the output from the second settling compartment may be electrolytically screened.

The output from the second settling compartment may be passed through an upward flow filter prior to passing to the reservoir.

According to a further aspect of the invention there is provdied a method of treating farm effluent which comprises passing the effluent, including solids and fibrous material, into a compartment, aerating the contents of said compartment and removing fibrous material with entrained activated sludge from said compartment via a rotary screen filter.

According to yet a further aspect of the invention there is provided an apparatus for the treatment of effluent in which means are provided to remove a predetermined amount of treated effluent and/or water and subsequently to introduce a further predetermined amount of effluent for treatment.

According to yet a further aspect of the invention there is provided an apparatus for the treatment of effluent which comprises a storage container adapted to store effluent to be treated, an aeration compartment for the treatment of the effluent, and pumping means arranged to pump effluent into the aeration compartment from the storage container only after treated effluent and/or water has been removed from outputs of the apparatus.

The aeration compartment may contain a presettling compartment, an output from the aeration compartment being via said presettling compartment.

Said output from the aeration compartment may be connected to a settling compartment which includes an upward flow filter. An output from the settling compartment may be connected to a compartment containing an electrolytic screen. An output from the settling compartment may be connected to maintain a predetermined level in the storage container. An output from the settling compartment may be connected to an output reservoir. A normally closed valve in the output from the aeration compartment may be arranged to be opened for a predetermined time and at closure of such valve said pump means may be arranged to be operated. Said pump means may be arranged to be switched off when the level of the contents of the aeration chamber reaches a sensor contained therein.

An output from the presettling compartment may be connected to a settling compartment which contains an electrolytic screen. An output from the settling compartment may be connected to an output reservoir which contains an upward flow filter. An output from the output reservoir may be connected to maintain the contents of the storage reservoir at a predetermined level. The connection between the settling compartment and the output reservoir may include a pump which is selectively operated and operates until the content of the settling compartment reaches a low level sensor contained therein, actuation of the low level sensor also causing operation of said pump means to pump the contents of the storage container into the aeration compartment until the level in the settling compartment reaches a high level sensor which switches off said pump means.

At least an output from the presettling compartment may be connected to a rotary screen filter so as to remove fibrous material. An output from the settling compartment may also be connected to the rotary screen filter.

The foregoing and further features of the invention may be more readily understood from the following description, of two preferred embodiments thereof, by way of example, with reference to the accompanying drawings, in which.

The apparatus is particularly for farm use and is designed to have a size suitable for a particular farm so as to operate continuously.

Figure 1:
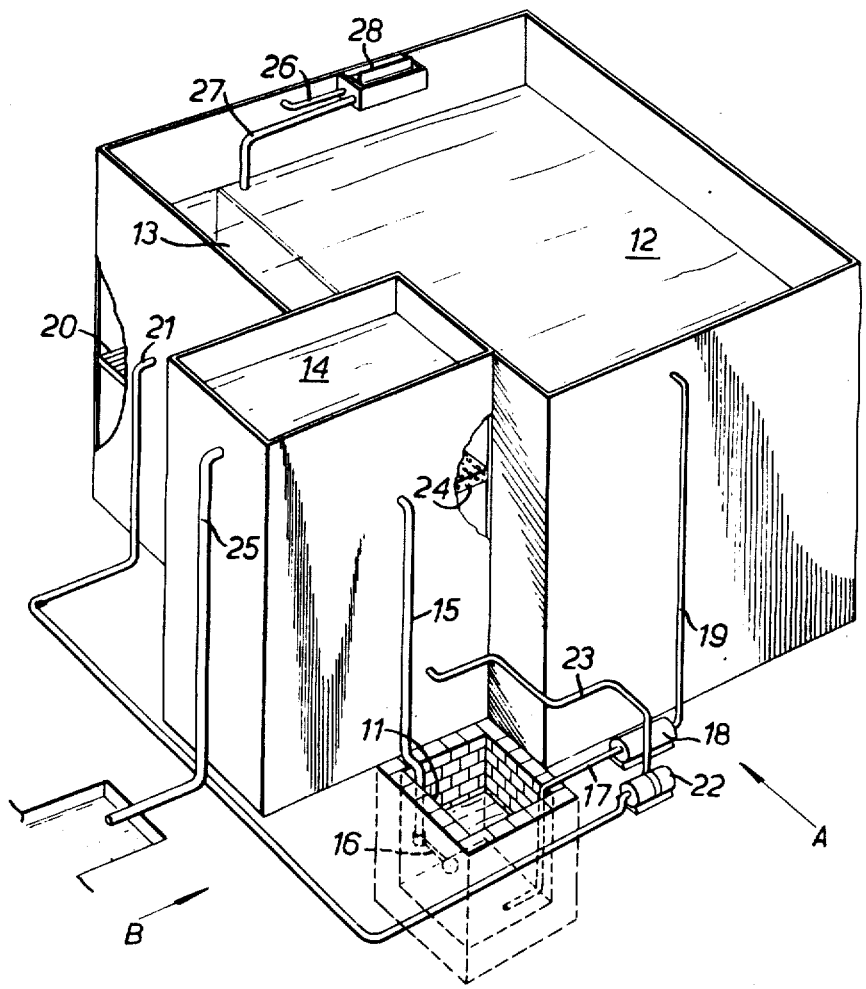
FIG. 1 is a perspective view of an effluent treatment apparatus.
Figure 2:
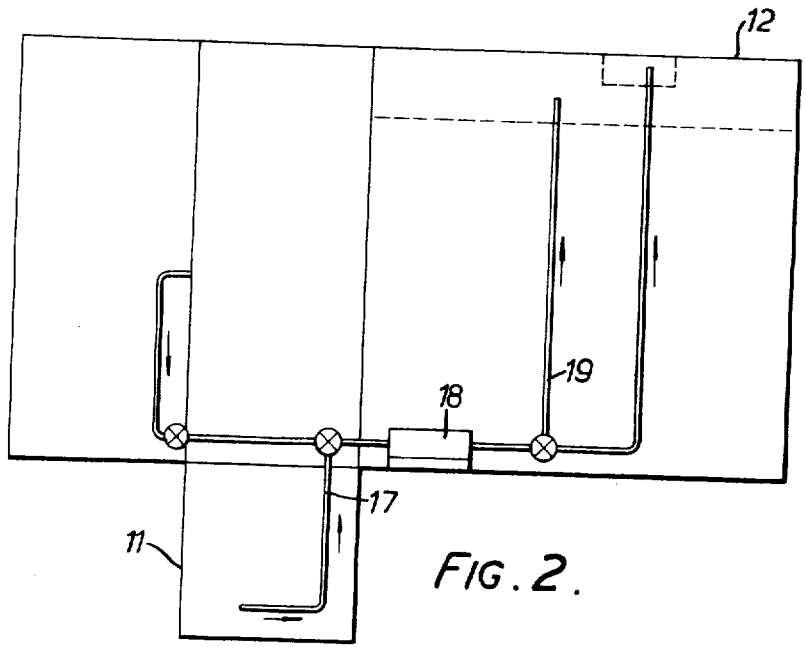
FIG. 2 is a schematic side elevational view of the apparatus of FIG. 1 in the direction of arrow A showing one pumping circuit.
Figure 3:
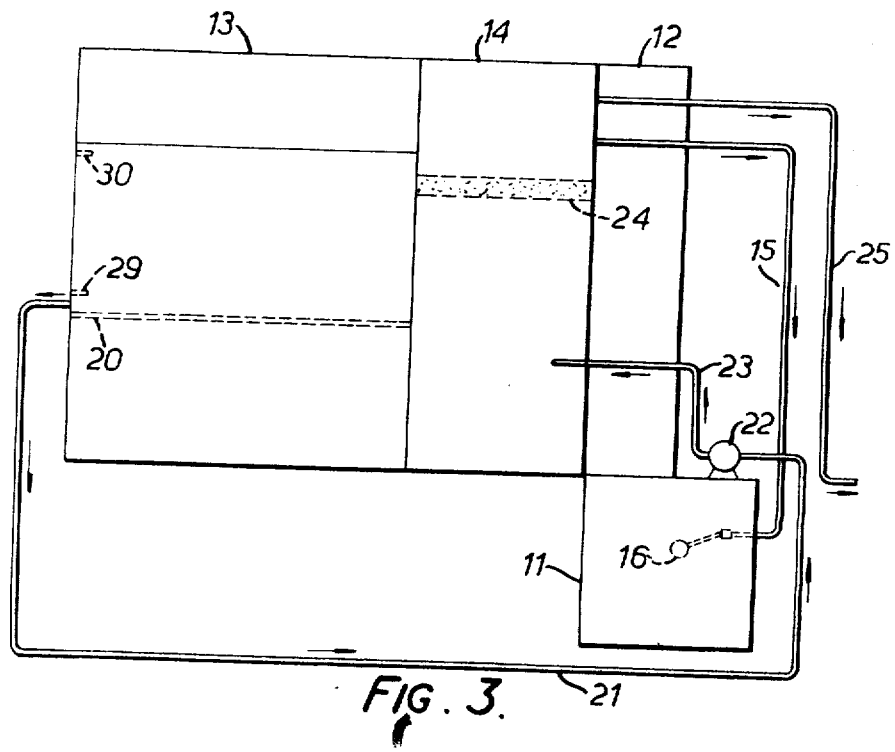
FIG. 3 is a schematic end elevational view of the apparatus of FIG. 1 in the direction of arrow B showing a further pumping circuit.

Referring firstly to FIGS. 1, 2 and 3 the apparatus comprises a storage container 11, in the form of a pit, an aeration compartment 12, a settling compartment 13, and an output reservoir 14.

The effluent, including solid and fibrous matter, is deposited in container 11 and oxygenated water is allowed to drain into container 11 from the upper level of output reservoir 14 via a conduit 15, under control of a ball valve 16 until a predetermined level is reached in container 11.

The content of container 11 is pumped, via a conduit 17 a pump 18 and a further conduit 19, into aeration compartment 12. The slurry in aeration compartment has compressed air pumped into it by any suitable aerator. The aeration compartment 12 houses a presettling compartment (see FIG. 4).

The content of aeration compartment 12, at the presettling compartment, spills over into settling compartment 13 which houses an electrolytic screen 20. The action of screen 20 is to produce small bubbles of hydrogen and oxygen. This acts to raise small fibrous particles to the surface, allows solids to fall to the bottom and leaves a clear zone above the screen 20.

An output conduit 21 is taken from above screen 20 via a pump 22 and a further conduit 23 to the bottom of output reservoir 14. Output reservoir 14 has an upward flow filter 24 positioned across it and output to drain is via a conduit 25 located above clarifier 24.

Fibrous material and activated sludge entrained therewith, settling in the presettling compartment and settling compartment 13 is fed via conduits 26 and 27 to a rotary screen filter 28. The filler 28 comprises rotary paddles which throw the fibrous material over the outer edge of aeration compartment 12, the liquid falling back into the aeration compartment through a screen.

With the apparatus fully charged and in operation the sequence of operation is as follows. The electrolytic screen 20 is switched off. Pump 22 is actuated to pump from settling compartment 13 into output reservoir 14 until the level in settling compartment reaches a low level sensor 29 (FIG. 3). The sensor 29 then causes pump 22 to be switched off and pump 18 is switched on. Pump 18 pumps from container 11 and reservoir 14 into compartment 12 until the overspill into settling compartment reaches a high level sensor 30 (FIG. 3) when the levels in compartments 12 and 13 are common. High level sensor 30 causes pump 18 to be switched off and electrolytic screen 20 to be switched on. The aeration and screening then proceeds for a predetermined time and the above sequence is then repeated.

Pump 20 is reversible so that the upward flow filter 24 can be cleaned and for floating suspended solids back into aeration compartment 12 from settling compartment 13.

Any build up of sludge in compartment 13 is pumped out by pump 18 through the rotary screen 28. Pump 18 can also be used to empty reservoir 14 for wash down of the building.

Figure 4:
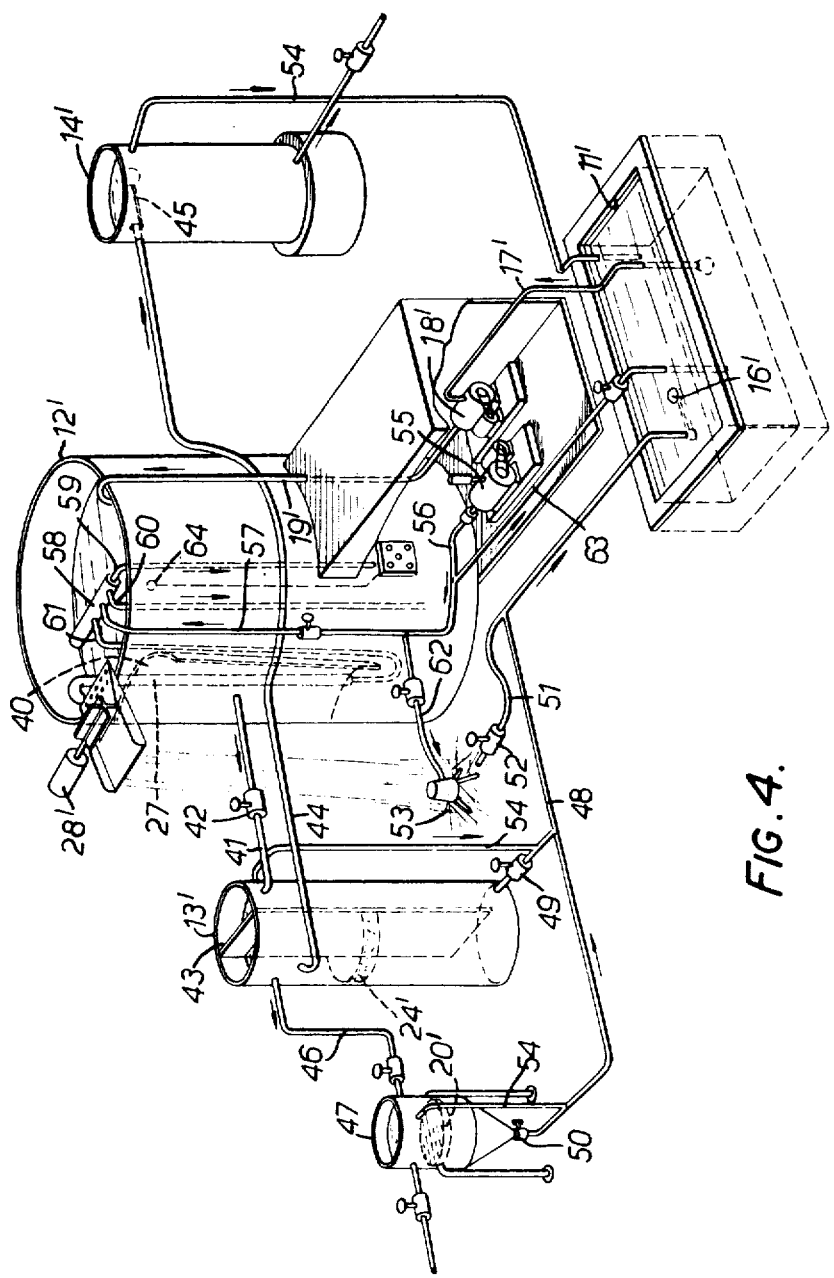
FIG. 4 is a perspective view of an alternative effluent treatment apparatus.

Referring now to FIG. 4 there is shown a system similar to that of FIGS. 1 to 3 but each of the compartments comprises a separate cylindrical tank. The aeration compartment 12' again includes a presettling compartment 40 but the output therefrom instead of spilling over into settling compartment 13' is connected thereto by a conduit 41 with a motor driven valve 42 interposed therein. The settling compartment 13' is divided by a baffle 43 across it except at the bottom thereof. The upward flow filter 24' is provided across the opposite half of compartment to that in which conduit 41 is connected. An output conduit 44 extends from above filter 24' to output reservoir 14' which includes a ball valve 45 to prevent overflow. A further output conduit 46 extends from above filter 24' to a compartment 47 which contains the electrolytic screen 20' and in this embodiment the compartment 47 may be omitted from the system if not required. This compartment 47 serves to increase the percentage sludge content of the treated effluent below screen 20'. An output conduit 48 extends from the bottom of settling compartment 13' and compartment 47, under respective control of valves 49 and 50, to maintain the content level of storage container 11', under further automatic control of ball valve 16'. When required the output from these compartments can be withdrawn via a connecting conduit 51 under control of a valve 52 and such output can be fed to a pile of fibrous material 53 removed by the rotary screen filter 28'. Each of the compartments 13', 14' and 47 have a separate overflow conduit 54 leading to the storage container 11'.

A motor driven compressor 55 provides compressed air which is fed via conduits 56 and 57 to a manifold 58. From manifold 58 the air is passed to conduits 59 and 60 to aerate the aeration compartment 11'. Also from manifold 58 air is passed to a conduit 61 to provide an air lift via larger conduit 27 for the fibrous material with entrained activated sludge in presettling compartment 40. A conduit 62 leads from conduit 56 to facilitate aeration of the fibre pile 53. A further conduit 63 leads from conduit 56 to aerate the the contents of storage container 11'.

In operation with the system fully charged and operational the compressor 55 is switched off and the motor driven valve is opened for a predetermined time to allow a predetermined amount of the content of aeration compartment 12' to pass through conduit 41 into settling compartment 13', so displacing the contents thereof as described hereinbefore. The lowering of the level of content of settling compartment 13' below the upward flow filter 24' provides cleaning of same. After the predetermined interval valve 42 is closed and pump 18' is started to pump the contents of storage container 11', which comprises effluent including solids and fibrous matter, into aeration compartment 12'. This continues until the level in aeration compartment reaches a level sensor 64 which switches off pump 18' and switches compressor 55 back on. The compressor 55 continues to operate for a predetermined time when the above sequence of events is repeated. The control for these sequences is provided by control box 65.

In an alternative control arrangement a level sensor may be provided in the compartment 47 for switching off pump 18' and switching compressor 55 back on. Apart from this the cycle for this alternative arrangement is identical to the one described above.

The volume of aeration compartment 12' relative to compartment 13' is in the order of between five and ten to one and ideally is about ten to one.

I claim:

1. A method of treating effluent containing fibrous particles and solids comprising:
   (a) maintaining said effluent in a storage container
   (b) aerating said effluent after storage
   (c) settling said effluent after aeration in a first settling compartment
   (d) settling said effluent in a second settling compartment, and
   (e) subjecting said effluent to electrolytic generation of bubbles and upward filtration whereby the electrolytically produced bubbles raise the fibrous particles upward toward a screen and solids fall to bottom leaving a clear treated liquid zone above the screen.

2. A method as claimed in claim 1 wherein the output from the second settling compartment is fed at least in part to an output reservoir.

3. A method as claimed in claim 2 wherein water from the treated effluent from the second settling compartment is passed to the storage container to maintain it at at least a predetermined level.

4. A method as claimed in claim 2 wherein water from the output reservoir and the treated effluent from the second settling compartment is passed to the storage container to maintain it at at least a predetermined level.

5. A method as claimed in claim 2 wherein water from the output reservoir is passed to the storage container to maintain it at at least a predetermined level.

6. A method as claimed in claim 1 wherein the output downstream from the second settling compartment is passed to a compartment in which it is electrolytically screened.

7. A method as claimed in claim 1 wherein the output from the second settling compartment is passed through an upward flow filter.

8. A method of treating farm effluent in a flow-through system comprising storing the effluent in a storage container, passing a predetermined amount of such stored effluent, which includes solids and fibrous material, into an aeration compartment subsequent to a predetermined amount of water being allowed to pass from the outflow of the system, aerating the contents of said aeration compartment, removing the fibrous material with entrained activated sludge from the aeration compartment, fedeing the output from said aeration compartment, in series, via two settling compartments to an electrolytic screening chamber, and subjecting said output to an electrolytic generation of bubbles and upward filtration whereby the electrolytically produced bubbles raise any remaining fibrous particles upward toward a screen and solids fall to the bottom leaving a clear treated liquid zone above the screen.

9. The method as recited in claim 8, wherein said fibrous material with entrained activated sludge is removed from the aeration compartment via a portion of the aeration compartment which is shielded from said aeration.

References Cited
UNITED STATES PATENTS

| | | | |
|---|---|---|---|
| 1,080,826 | 12/1913 | Gibson | 204—152 |
| 1,831,076 | 11/1931 | Neeley | 204—152 |
| 1,982,246 | 11/1934 | Fischer | 210—15 |
| 3,060,118 | 10/1962 | Schoeffel | 210—3 |
| 3,126,333 | 3/1964 | Williams | 210—15 |
| 3,335,082 | 8/1967 | Ullrich | 210—15 |
| 3,371,033 | 2/1968 | Simmons et al. | 210—3 |
| 3,372,111 | 3/1968 | Vahlsing, Jr. | 210—62 |
| 3,429,806 | 2/1969 | Carter et al. | 210—3 |
| 3,479,281 | 11/1969 | Kikindai et al. | 204—149 X |
| 3,684,703 | 8/1972 | Marmo | 204—149 X |

HOWARD S. WILLIAMS, Primary Examiner

A. C. PRESCOTT, Assistant Examiner

U.S. Cl. X.R.

204—149; 210—13, 44